United States Patent [19]

Oder et al.

[11] Patent Number: 5,519,392
[45] Date of Patent: May 21, 1996

[54] METHOD AND DEVICE FOR ASSISTING NAVIGATION

[75] Inventors: Engin Oder, Voisins le Bretonneux; Francine Pierre, Paris; Jean-Marie Renouard, Saint Cloud, all of France

[73] Assignee: Sextant Avionique, Meudon la Foret, France

[21] Appl. No.: 401,289

[22] Filed: Mar. 9, 1995

Related U.S. Application Data

[63] Continuation of Ser. No. 100,461, Aug. 2, 1993, abandoned.

[30] Foreign Application Priority Data

Jul. 31, 1992 [FR] France .................. 92 09738

[51] Int. Cl.$^6$ .................................. G08G 1/123
[52] U.S. Cl. .................. 340/995; 340/990; 364/449
[58] Field of Search .................... 340/995, 990, 340/971; 364/449, 460, 444

[56] References Cited

U.S. PATENT DOCUMENTS

| | | | |
|---|---|---|---|
| 4,642,775 | 2/1987 | Cline et al. | 364/444 |
| 4,796,190 | 1/1989 | Cummings | 364/449 |
| 4,862,374 | 8/1989 | Ziemann | 340/995 |
| 4,951,212 | 8/1990 | Kurihara et al. | 340/995 |
| 5,057,835 | 10/1991 | Factor et al. | 340/995 |
| 5,059,970 | 10/1991 | Raubenheimer et al. | 340/995 |
| 5,089,816 | 2/1992 | Holmes, Jr. | 340/995 |
| 5,111,400 | 5/1992 | Yoder | 364/424.01 |
| 5,113,178 | 5/1992 | Yasuda et al. | 340/995 |
| 5,117,363 | 5/1992 | Akiyama et al. | 340/995 |
| 5,243,529 | 9/1993 | Kashiwazaki | 340/990 |
| 5,340,061 | 8/1994 | Vaquier et al. | 340/995 |
| 5,398,188 | 3/1995 | Maruyama | 340/995 |

FOREIGN PATENT DOCUMENTS 2249417 5/1992 United Kingdom .

OTHER PUBLICATIONS

Proceedings of the IEEE 1986 Nat'l Aerospace and Electronics Conf. NAECON 1986, Dayton, Ohio, EUA, 19–23 May Interface on the Advanced Fighter Technology Integration F–16: vol. 2, pp. 595–607.

Aviation Week and Space Technology; vol. 109, No. 6, Aug. 1978, New York US; pp. 53–58: "Horizontal Situation Display Readied".

Primary Examiner—Brent A. Swarthout
Attorney, Agent, or Firm—Browdy and Neimark

[57] ABSTRACT

The method for assisting navigation of the invention uses a documentary management system including a processor associated with memories containing at least the stored image of a map of the region traversed by the vehicle and information relating to a multiplicity of objects localized in said region, this information being divided into sets of objects having their own exploitation means. This method includes the acquisition of the position of the vehicle, the introduction of the trajectory to be crossed from this position, the displaying of a geographical zone including said position and one significant portion of the trajectory to be travelled through, the displaying of a symbol representative of the vehicle, the selection by the operator of a set of objects, the selection by the system of the information of this set relating to the localized objects in said zone, the display by overprinting of the symbols thus selected, the selection by the operator of one of said sets and activation of the exploitation means associated with this set Application is in particular to civil and commercial aviation.

39 Claims, 5 Drawing Sheets

METHOD AND DEVICE FOR ASSISTING NAVIGATION

This application is a continuation of application Ser. No. 08/100,461, filed Aug. 2, 1993, and now abandoned.

FIELD OF THE INVENTION

The present invention concerns a method and device for assisting navigation on board a vehicle, such as an aircraft, and more specifically intended to facilitate navigation tasks from navigation maps and any associated documentation.

BACKGROUND OF THE INVENTION

It applies more particularly but not exclusively to civil and commercial aviation where current navigation techniques make use of printed aeronavigation maps indicating the airports, the air routes, radionavigation markers, as well as information not specific to air navigation. These maps have many drawbacks:

- they are too big to be easily handled in the small space of a pilot's cockpit;
- They do not provide instant access to the map portion where the aircraft is located.
- They do not provide instant access to all the information required for navigation, such as detailed information concerning an airport or a radionavigation marker;
- Their scale is either too small to be able to legibly show all the required information or too big to display a sufficiently large portion of the trajectory with respect to the average speed of the aircraft used on regular lines;
- the information shown is not completely useful for a given flight, these maps showing all useful information for all possible routes within the displayed geographical zone;
- the sets of information displayed are static and cannot be easily updated; and, in particular, no means is provided to indicate the existence of a NOTAM ("Notice to Air Men"), and
- searching for them on the map is a difficult task at night.

SUMMARY OF THE INVENTION

The object of the invention is more particularly to eliminate these drawbacks and ease the navigation tasks for the crew to be carried out during a flight.

To this effect, the invention offers a method for assisting navigation on board a vehicle using a documentary management system based on processors including at least one communication terminal including a display surface and memories where all the information required for navigation is stored.

According to the invention, this method is characterized in that a digitized image representing a geopolitical map of the region likely to be traversed by the vehicle and information relating to a multiplicity of objects of various types localized in said region are stored in memories, this information comprising for each object symbols representing the nature of the object, one geographical position and a set of information, these objects being divided according to their respective nature into a set of objects respectively associated with distinct means for exploiting the sets of information, said method including:

- the real time acquisition of the geographical position of the vehicle;
- the introduction of the trajectory to be traversed from the current position of the vehicle as far as the destination position;
- the periodical determination of one portion of the digitized image representing one geographical zone which includes both the current position of the vehicle and one significant portion of the trajectory to be traversed;
- the displaying on the display surface of the specific image portion and of symbols representing said trajectory portion;
- the real time overprinted displaying on said display surface of a symbol representing the vehicle by observing its geographical position with respect to said geographical zone;
- the selection by the operator of at least one set of objects;
- the selection by the system from amongst the sets of information relating to the selected set of objects of any information relating to objects localized in said geographical zone;
- the overprinted displaying on said image portion of symbols representing the objects thus selected by observing the geographical position with respect to said geographical zone; and
- the selection by the operator of one of the sets of objects displayed on the display surface and activation of the exploitation means associated with said set of objects.

Means can further be provided for indicating to the user that information displayed is modified by a NOTAM. To this effect, the user disposes of two methods:

1) If the NOTAM modifies an indicated element, an icon (or similar) invites to press a key "NOT" which causes the concerned text to appear.

2) It is possible, after having selected a function NOTAM, to cause the "sleeping NOTAMs" (NOTAMs which modifiy information not displayed on the screen) to appear and, by the cursor, it is possible to designate the spots which it is desired to consult.

The digitized image used may represent a map, for example on a scale of one centimeter for fifty kilometers and solely comprising high altitude zones, aquatic surfaces, major towns, the main public highways and state frontiers.

Despite the small size of the scale used, the density of the information displayed in this way is sufficiently low for rendering this map legible.

In this way, it is possible to position a relatively large portion of the trajectory of the aerodyne, having regard to its speed, on the displayed map portion. Thus, even in the case of the fastest aerodynes, the pilot shall be able to visualize the future trajectory of the aerodyne and its environment for sufficiently large distances to ensure a certain safety and comfort.

Within the context of air navigation, the sets of objects shown overprinted on the image of the map may be the following:

- radio-navigation markers,
- particular zones and the delimitations of zones of the same radio frequency,
- the air routes,
- the high altitude points and in particular those situated at an altitude higher than that of the aerodyne,
- the airports, . . .

and for those aerodynes equipped with a radio link, such as a "data link":

meteorological data, such as isobar curves according to altitude and the images of bulks of clouds, the respective positions of other aerodynes flying over the same geographical zone, . . .

In relation to conventional navigation maps, this method is thus able to select the objects it is desired to see featured on the map portion displayed on the display surface according to their nature and their proximity with the current position of the vehicle, as well as other criteria, such as the trajectory introduced into the system. This characteristic authorizes much more use of small representation scales.

As in the case of meteorological data, the information displayed may be temporary.

According to one particular characteristic of the invention, the method also includes:

the activation of a designation device associated with one of the sets of objects displayed on the display surface and which the operator is able to move on the screen as he pleases, the designation by the operator with the aid of the designation device of a symbol representing an object and displaying on the full screen or in a window by overprinting on the image displayed of any information relating to the selected object.

Advantageously, this method also includes:

the storing of the windows displayed on the screen in a storage zone provided to this effect, and the displaying overprinted on the image present on the display surface of the contents of this storage zone as and when requested by the pilot.

By means of this disposition, the operator is able to compose an image able to be displayed at any moment in which he himself has collated the information he frequently needs to consult.

According to another particular characteristic of the invention, the various exploitation means associated with the sets of objects also include:

tools for optimizing the route according to weather conditions, tools for assisting the decision making it possible to determine the best airport the aerodyne is to be directed to according to any restrictions concerning the weather and fuel and the current position of the aerodyne, and navigation calculation tools for calculating the distance and the course between two points, for example.

The results supplied by these devices are advantageously displayed when requested by the operator as overprinted on the image present on the display surface.

These various characteristics make it possible to obtain a method for assisting navigation which proves to be particularly ergonomic and adapted to the field of aviation.

The method of the invention is implemented on a communication terminal including a rectangular screen and keys distributed on the periphery of the screen. These keys are reconfigurable according to the page displayed on the screen, each key being associated with an adjacent zone of the screen where the function allocated to it may be displayed.

The fact of having the keys distributed around the screen has many advantages, in particular from the point of view of its spatial requirement, which is particularly appreciated inside the confined space of a pilot's cockpit.

This layout of keys makes it possible to obtain a set of entirely reconfigurable keys i.e. according to the page displayed on the screen, it being possible to display simultaneously the functions of each key on the screen, independently of the names of the main functions of the terminal appearing on the keys allocated to them.

This terminal offers two modes for displaying cards, namely one day mode and one night mode. This characteristic allows maps to be consulted without an operator being dazzled regardless of the luminous environment, whilst preserving the symbology of colors.

BRIEF DESCRIPTION OF THE DRAWINGS

There now follows the description of one non-restrictive example of one mode for implementing the method of the invention with reference to the accompanying drawings on which.

DETAILED DESCRIPTION OF THE PREFERRED EMBODIMENTS

Figure 1:
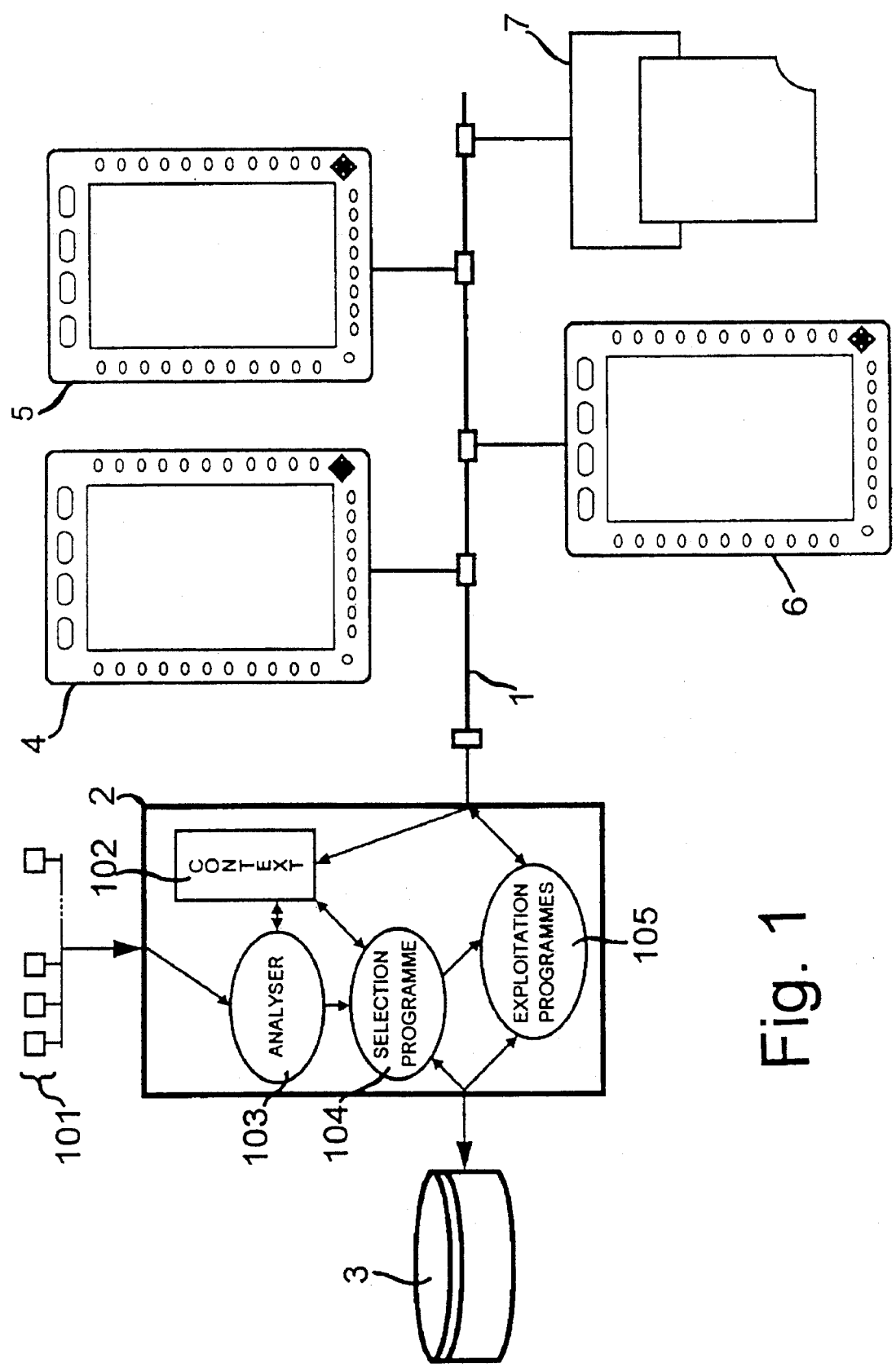
FIG. 1 diagrammatically shows the architecture of the system including one central unit to which storage units and communication terminals are connected.

The diagram shown on FIG. 1 shows an example of the architecture of a system for being embarked on board a commercial airplane and implementing the method for assisting air navigation.

This system is constituted by a local area network 1 to which the following are connected:

a central processing unit 2 managing access to the local area network and the bulk memory 3 which may be constituted by several magnetic, optical or magneto-optical disk type units, communication terminals 4,5,6, adapted to be used on board a commercial aircraft and in particular in the pilot's cockpit where the available space is relatively small, and a printer 7 offering the operator the possibility of printing the image displayed on the screen.

The central processing unit 2 is connected via the buses of the aircraft to the set 101 of sensors and the embarked electronic systems so as to acquire in real time the data available on the other items of equipment on board, said data being in particular the geograpical position and the altitude of the plane, the meteorological data concerning the flight and the position and altitude of other planes situated nearby.

The bulk memory 3 is able to store in the form of a data base all the information normally found in printed form in the pilot's cockpit of a commercial aircraft. This information specifically concerns:

the documentation associated with each airport of the geographical zone traversed and comprising in particular the description of the take-off and landing procedures, the manuals and navigation maps of the geographical zone passed through, . . .

Both the images and navigation maps are stored in the form of digital files in the data base. In order to be processed so as to overprint symbols representing the objects linked to navigation, such as the radionavigation markers or the airports, each file containing a map is associated with a "tag" file making it possible to identify on the map rectangular zones and "vector" files for marking there straight segments of any orientation.

This data base is associated with a set of programs 105 for exploiting the data it collates.

These programs are designed in particular to facilitate navigation tasks.

These programs 105 constitute the translation into data processing language of the various scenarios according to which the items of information of the data base are to be exploited and chained with one another. In particular, they define for each exploitation stage:

the information to be presented on the screen, the mode for presenting information, the active keys of the terminal and their respective functions, that is the respective programs to be executed.

The central processing unit 2 implements a program 103 known as an "analyser" program which is activated upon the arrival of an event, either from the environment 101 of the system or from one of the terminals 4,5,6 and generated by an operator when he presses a key. The aim of this program is to analyse the events which occur so as to manage a set of variables defining the real time context 102 in which the aircraft is located. With the aim of finely analysing complex situations, it may be designed according to the model of an expert system comprising a knowledge base, a rule base and an inference engine.

The variables of the real time context 102 especially concern:

the description of the current flight (departure, destination and alternate airport, route), the current flight phase, the situation of the aircraft (position, altitude, speed), detected malfunctions . . .

On each modification of the real time context 102, the analyser 103 triggers a selection program 104 which, according to the real time context 102, establishes dedicated links between the data base information best adapted to the needs of the crew resulting from the new real time context 102 and the exploitation programs 105.

When the operator triggers an exploitation program 105 by activating a function key of a terminal 4,5,6, the selected exploitation program uses these dedicated links to priority-exploit the information best adapted to the real time context of the airplane. Of course, the operator still has the possibility of gaining access to the other information contained in the data base.

So as to gain access to the data base, the selection 104 and exploitation 105 programs call upon the functions of a data base management system which may be of a current type.

Figure 2:
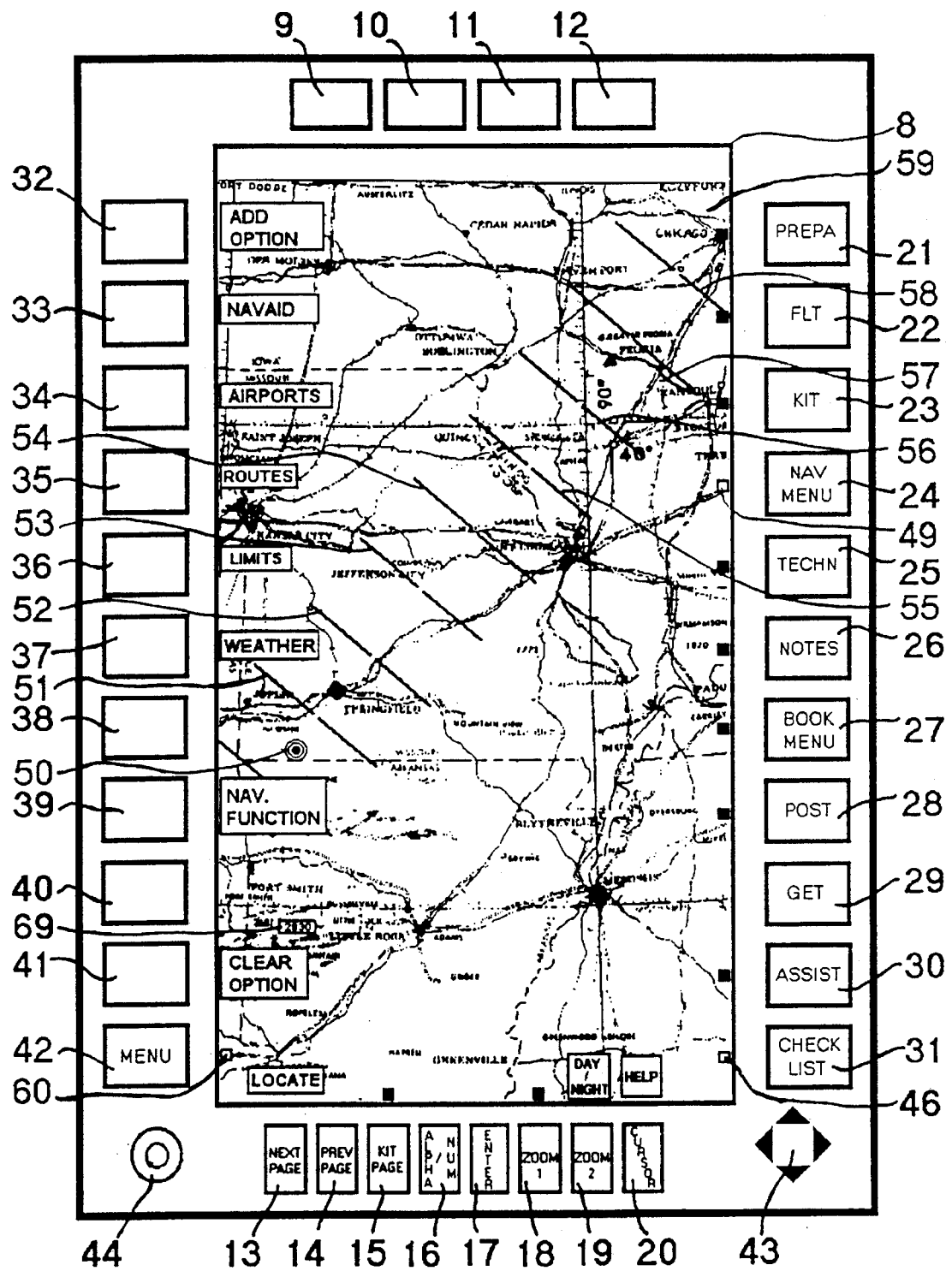
FIGS. 2 to 5 show one communication terminal and various screens chained by the system during execution of the method of the invention.

On FIG. 2, each of the communication terminals 4,5,6 is constituted by a rectangular display screen 8 around which keys are distributed, namely:

four keys 9 to 12 aligned along the upper edge of the screen 8, eight keys 13 to 20 aligned along the lower edge of the screen 8, eleven keys aligned along the righthand 20 to 31 and lefthand 32 to 42 edges of the screen 8, a displacement or shift key 43 situated in the lower righthand corner of the terminal and representing four arrows for effecting movements of a cursor or of the image present on the screen in all directions and at variable speed, and a potentiometer 44 situated in the lower lefthand corner so as to switch on or off the terminal and adjust the luminosity of the screen.

Certain keys have a predetermined function and in this case, the title of the function appears on the key. However, these keys may be reconfigured according to the page displayed on the screen, either to activate other functions or to enter chains of characters. In this case, the name of the function allocated to each key or the corresponding character is shown on the screen near the key.

Each key may take one of the three following states:

a non activatable state when the key is not allocated to any function, an activatable state when the key is able to activate a function, and an active state when the function associated with the key is being executed.

Near each key with a predetermined function, there is a state indicator represented by a square on the figures, for example 46, 49, 60, which when lit up, indicates that the key is active (in white on the figures) or activatable (in black) according to the color of the lit-up indicator, and which when switched off (invisible on the figures) indicates that the key is non activatable.

The keys on which no function wording appears are activatable when a function wording appears on the screen near the key; otherwise, said keys are non activatable.

The keys of the righthand column, 21 to 31, are allocated to the main functions of the system, as for example "PREPA" 21 for flight preparation or "NAV MENU" 24 for assisting navigation.

The keys on the lefthand column generally make it possible to carry out selections when menus are displayed on the screen.

The last key of the lefthand column called "MENU" 42 enables one to display the last menu which made it possible to gain access to the current page. This key may be activated many times subsequently. In this case, the various chained menus for gaining access to the current page are successively displayed until the first menu of the corresponding main function is obtained.

The keys 13 to 20 of the row below the screen are able to activate functions linked to management of the terminal.

The system is designed in such a way as to make it possible to introduce and store references concerning departure and destination airports and determine the direction of the flight trajectory thus defined.

Figure 3:
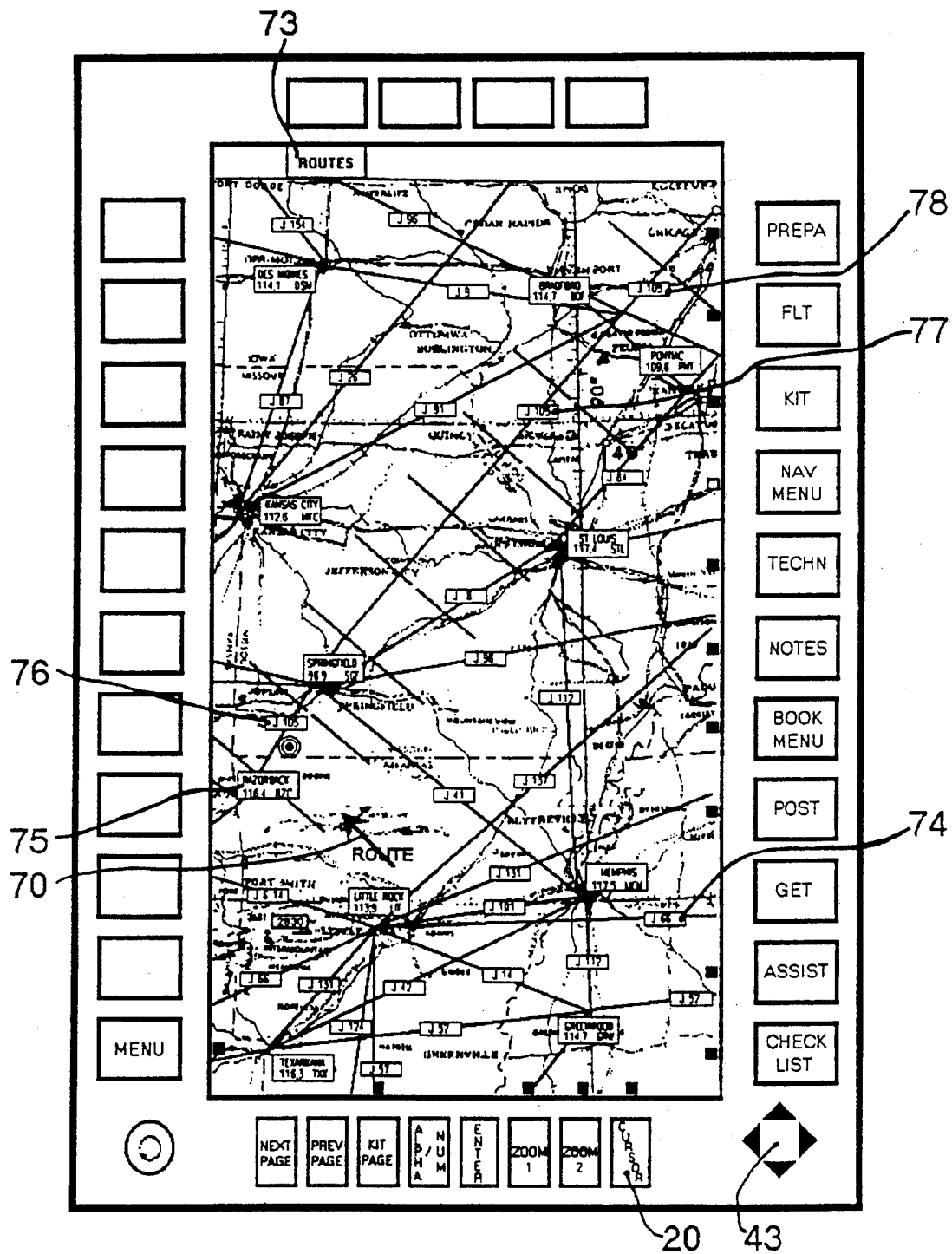

In order to activate the function for assisting navigation, it suffices to press the key "NAV MENU" 24 which then moves on to the active state (indicated by the white square 49 near the key 24 on FIG. 3).

This action causes the displaying of one map portion 59 representing one geographical zone and overprinting of the position of the aircraft 50 at the moment this function is activated.

This map indicates the meridians and parallels, major towns, aquatic surfaces, main highways, state frontiers and zones of the relief with the highest altitudes.

Overprinted on the map 59 is also the trajectory of the aircraft indicated by parallel straight segments 51 to 58 perpendicularly intersecting at their central point, the axis joining the departure and destination airports. The spacing of these marks corresponds to the distance covered by the aircraft during a constant period of flight, 10 minutes for example, having regard to the average speed of the aircraft during the various flight phases.

The scale of the maps used is small, for example 1 centimeter for 50 kilometers, this being the case on the figures, without the density of information shown being too large for impeding legibility of said information.

The map is centered on the screen according to the current position of the aircraft and its trajectory so as to be able to display the position of the aircraft and the largest possible trajectory portion.

The combination of the use of a small scale and the centering principle enables the pilot to simultaneously visualize a large portion of the trajectory to be traversed and its environment, even by taking account of the high speed of certain aircraft.

As the geographical position of the plane is acquired in real time, the symbol 50 representing the aircraft on the map is refreshed in real time.

Similarly, so that the portion of the trajectory to be traversed displayed is still the largest possible, the map is periodically recentered with respect to the screen according to the evolution of the position of the aircraft.

The map 59 also shows a real-time signalling of the altitudes of summits higher than that of the aircraft, said signalling consisting of frames encircling the values of these altitudes and whose color depends on the distance between the summit and the aircraft.

To simplify their reading, these cards are always orientated so that the top of the screen shows north. Moreover, it is possible to change the day or night display mode. To do so, it is sufficient to press the key "ASSIST" 30. At this moment, certain keys of the line below the screen are reconfigured. Thus, the key "ZOOM 2" 19 is reconfigured into "DAY/NIGHT". When said key 19 is activated, all the black points of the screen change to white and the white points become black. The remaining colors remain unchanged.

In this way, the information is displayed on a black background in the night mode and on a white background in the day mode.

This disposition provides good visibility of the images displayed on the screen, regardless of the luminous environment of the pilot's cockpit.

If the operator has activated the key "ASSIST" 30, the other reconfigured keys make it possible to indicate an object by stating its name (key "NEXT PAGE" 13 reconfigured into "LOCALIZE") and obtain assistance on the use of the terminal (key "CURSOR" 20 reconfigured into "AIDE"). If the key "LOCALIZE" 13 is activated, all the keys of the terminal are reconfigured to allow for entering a chain of characters.

The key "MENU" 42 makes it possible to display a selection menu of the type of objects specific to air navigation to be added to the map 59 so as to constitute a navigation map.

Thus, on the screen of FIG. 2, the following activatable keys of the column situated on the lefthand side of the screen make it possible to position on the map displayed on the screen data specific to air navigation:

the key 32 entitled "OPTIONS TO BE ADDED" makes it possible with the aid of a menu to select a type of objects to be displayed overprinted on the map appearing on the screen, the key 33 entitled "RADIO NAV." is able to display all the radio-navigation markers.

the key 34 entitled "AIRPORTS" displays all the airports, the key 35 entitled "ROUTES" displays all the air routes, the key 36 entitled "LIMITS" displays the limits of communication frequency zones and the associated frequencies, the key 37 entitled "METEO" makes it possible to gain access to information concerning the weather associated with the flight, and the key 39 entitled "NAVIGATION FUNCTIONS" makes it possible to gain access to navigation functions, such as information concerning calculation of the course and the distance between two points, the optimization of the route according to weather conditions, or for determining the best airport to be directed to according to restrictions concerning the weather and fuel, and the key 41 entitled "OPTIONS TO BE DELETED" makes it possible with the aid of a menu to select a type of objects to be erased from the map present on the screen.

When this menu is displayed, the key "MENU" 42 is in the active state as indicated by its state indicator 60.

If one of the keys 33 to 39 is activated without having previously activated the key "OPTIONS TO BE ADDED" 32, the symbols representative of the selected type of objects are displayed to replace the symbols, if the latter exist, of objects of the type previously selected.

On the map portion 59 displayed on the screen, the altitudes of the summits higher than that of the aircraft possess a special signalling: these are surrounded by a frame 69 whose color depends on the distance between the aircraft and the corresponding summit.

The map 59 displayed on the screen shown on FIG. 3 has been obtained by activating the key 35 entitled "ROUTES" and then the key "MENU" 42 to have reappear the menu of FIG. 2, and finally the key 33 entitled "RADIO NAV." for displaying the radio-navigation markers. The map obtained in this way shows the air routes entitled, for example, "J 66" 74 and delimited by radio-navigation markers, such as "LITTLE ROCK" 75.

This screen makes it possible to accurately define the route to be followed by the aircraft. In order to do this, the operator activates a cursor by activating the key "CURSOR" 20. This action makes it possible to display on the screen a menu for selecting one of the types of objects shown on the screen, in this instance "route" or "radio-navigation marker" which it is desired to designate. If the "route" type of object is selected, a cursor 70 represented by a colored arrow entitled "ROUTE" appears in the center of the screen. This cursor may be moved in all directions by means of the displacement key 43. Each time the arrow 70 moves close to a segment representing an air route section, this segment changes color.

So as to designate a route section, it merely suffices to bring the arrow 70 sufficiently close to this route section so that it changes color and then validate by means of the key "ENTER" 17. The route sections thus designated are represented by means of a particular color.

When the cursor 70 arrives close to one edge of the screen 8 and the operator continues to move the cursor in the direction of this edge, the cursor remains stationary, whereas the image of the map displayed on the screen moves in the opposite direction. In this way, it is possible to designate an object outside the geographical zone shown on the screen. So as to recenter the map on the current position of the aircraft and its trajectory, it merely suffices to press the key reconfigured into "RETURN TO REF" (key 19).

Figure 4:
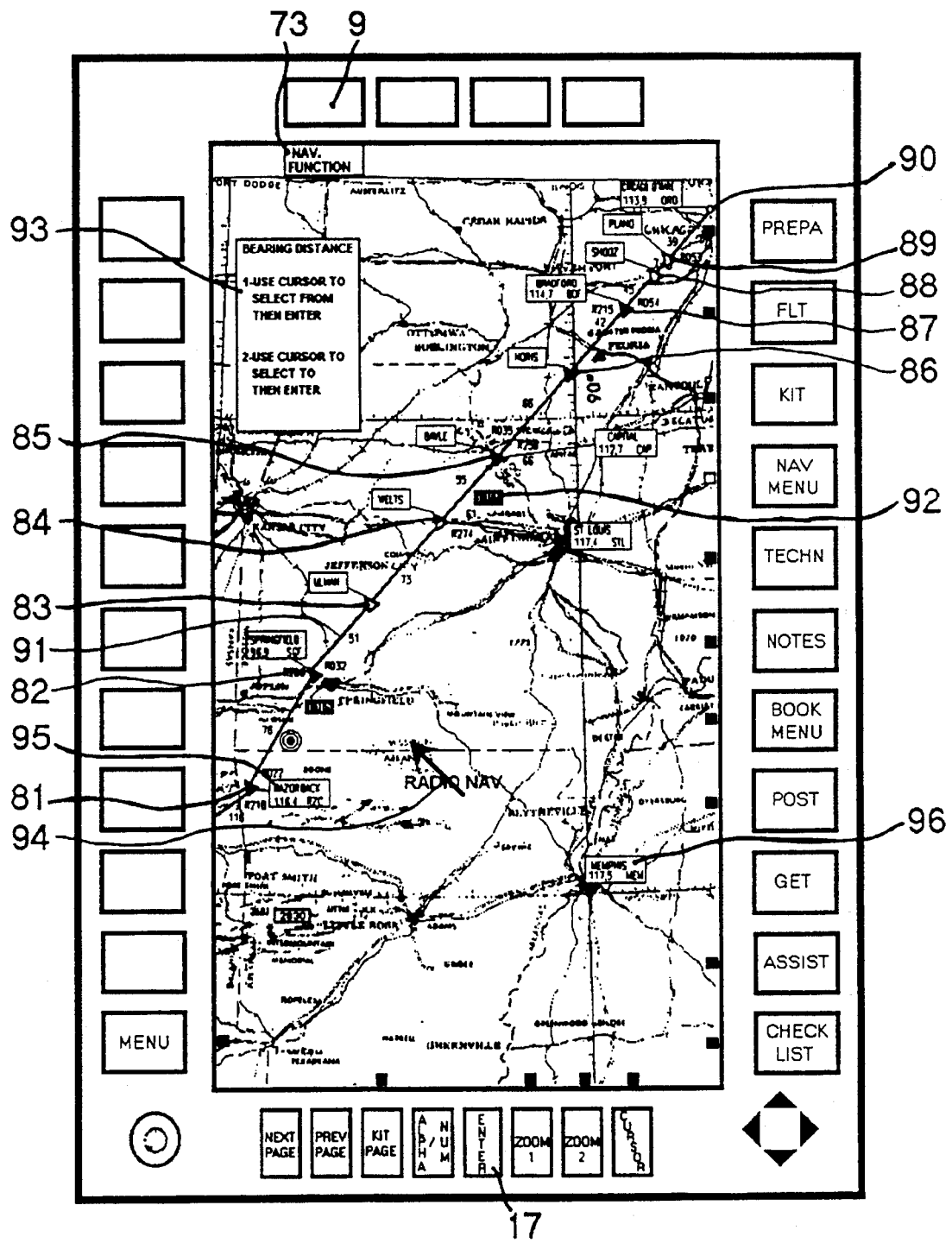

In the example shown on FIG. 3, the operator shall designate the route "J 105" 76,77,78 which is closest to the trajectory indicated by the segments 51 to 58 (FIG. 2), which makes it possible to define the route to be followed as shown on FIG. 4.

This screen indicates the detailed route the aircraft needs to follow so as to arrive at the destination introduced when initializing the system.

The segments 51 to 58 indicating the trajectory have disappeared and are replaced by a line 80 composed of segments delimited by points of marks 81 to 89 represented by triangles. These points of marks may or may not correspond to a radio-navigation marker 81,82,87. The destination is indicated by a circle 90.

Corresponding to each segment (for example 91) is a course ("R032") and a distance in nautical miles ("51").

The name of the route "J 105" 92 is indicated in white on a black background.

This result could have been obtained by asking the system to determine the best possible route according to the meteorological conditions with the aid of the option "NAVIGATION FUNCTIONS" 39 of the menu of FIG. 2. The system then indicates the sections of the route it proposes by modifying the color.

The definition of the route to follow may be transferred directly from a FMC ("FLIGHT MANAGEMENT COMPUTER").

When the operator has validated the proposed route by pressing the key "ENTER" 17 or has finished selecting route sections as far as the destination point, the other displayed objects may be made to disappear, as shown on FIG. 4, by controlling the display of the menu of FIG. 2 with the aid of the key "MENU" 42 and then activating the key "DELETE OPTION". This operation makes it possible to display a new menu allowing for the selection of the types of objects present on the screen and which it is desired to delete, that is "ROUTES" and "RADIO NAV".

From this screen in particular, it is possible to calculate the distance between two points. To do this, it suffices for example to display the menu of FIG. 2 by means of the key "MENU" 42 and press the key 33 "RADIO NAV." so as to display all the radionavigation markers. Each of said markers (for example 96 on FIG. 4) is represented by a frame in which their name ("MEMPHIS") and code ("MEM") features, as well as their transmission frequency ("117.5").

In order to activate the distance calculating function, it is necessary to redisplay the menu which has diappeared when the radionavigation markers were displayed and then the key 39 "NAVIGATION FUNCTIONS" is pressed so as to be able to select said function. A cursor 94 allocated for designation of the radionavigation markers and a window 93 indicating the steps to be followed then appear on the screen (FIG. 4).

This window 93 indicates that a first point must be designated with the aid of the cursor and validated with the key "ENTER" 17 and then similarly a second point The first point may be either the position of the aircraft or a marker, whereas the second point must be a marker.

Figure 5:
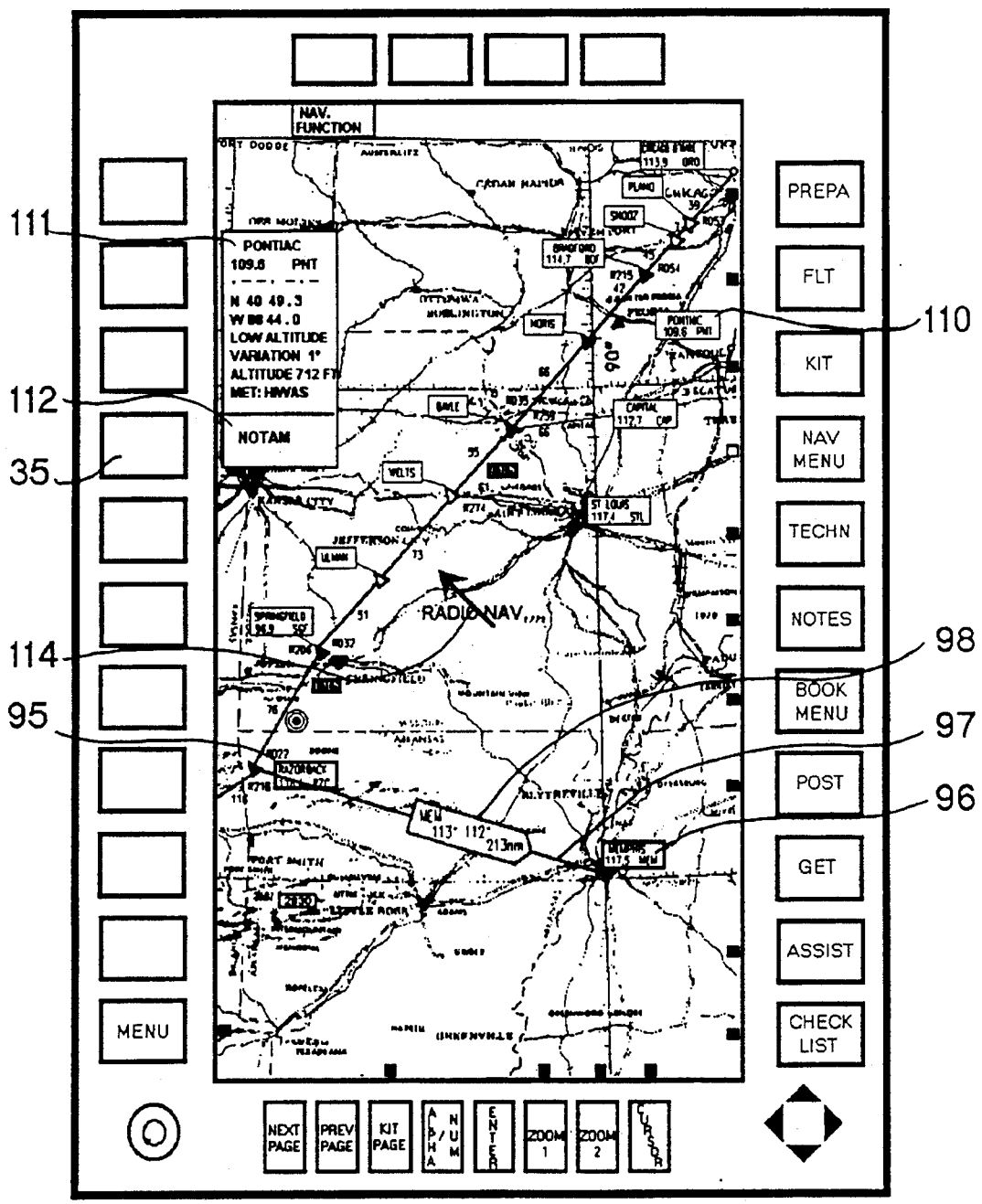

Thus, the screen of FIG. 5 is obtained from the screen of FIG. 4 when the operator has designated as a first point the marker entitled "RAZORBACK" 95 and marked by a frame thicker than that of the other markers, and as a second point the marker entitled "MEMPHIS" 96 marked in the same way.

These two points are connected by a line segment 97 and a polygon 98 in which the destination "MEM" (second point), the departure course "112°" and the destination course "113°" feature so as to take account of the magnetic declination, as well as the distance separating said two points 95, 96 "213 nm" in nautical miles.

It is also possible to designate a point by stating its name or its altitude or longitude position by pressing the key "ASSIST" 30 and then the key "LOCALIZE" 13 (FIG. 2). All the keys are then reconfigured so as to make it possible to enter alphanumeric characters. In this way, the system supplies a quick means for designating any geographical point, regardless of whether it appears in the geograhical zone displayed on the screen or not.

So as to gain access to the information associated with the objects, such as the radio-navigation markers, represented on the map portion displayed on the screen, it merely suffices, as previously described, to activate the cursor 114 with the aid of the key "CURSOR" 20 and then allocate it to the radio-navigation markers with the aid of the menu which then appears. By bringing the cursor 114 onto the marker entitled "PONTIAC" 110 for which it is desired to obtain detailed information and by validating this designation by pressing the key "ENTER" 17, a window 111 appears overprinted on the map. Various available information concerning the designated marker, such as the morse code signal which it transmits, its geographical position and its altitude are provided in said window. Sometimes, temporary information (for example, an out-of-order service period for maintenance) is associated with it and can be accessed by means of a key (for example key 35) of the righthand column of the screen configurated for this purpose and entitled "NOTES" 112.

The overprinted displayed windows on the screen may be moved or deleted. To this effect, when a window is shown on the screen, two additional options appear on the menu displayed upon activation of the key "CURSOR" 20. These two functions make it possible to allocate the cursor for designating one window with the intention of moving or deleting it respectively.

Moreover, if the operator presses the key "KIT PAGE" 15, all the windows displayed on the screen are stored in a memory set aside for this purpose and whose content may be displayed with the aid of the single key "KIT 23". This functionality enables the operator to collate in one or several rapidly attainable screen pages the information he considers important and frequently shall need to consult.

Generally speaking, when a map is displayed, the operator may be able to enlarge it with the aid of the keys "ZOOM 1" 18 and "ZOOM 2" 19 and shift it with respect to the screen with the aid of the key 43 so as to display another geographical zone. These actions have the effect of stopping the periodical refreshing of the map and the position of the aircraft. A similar effect occurs when the operator displays a document on a full screen. In order to reactivate said refreshing, it suffices to press the key "NAV MENU" 24 which causes the display and centering of the last navigation map displayed before these functions have been activated, but by taking account of the last position of the aircraft acquired by the system and its trajectory.

What is claimed is:

1. Method for assisting navigation on board a vehicle using a documentary management system based on processors comprising at least one communication terminal including a display surface and memories storing a succession of pixel data each representing an image point of a digitized image representing a geopolitical map of the region likely to be traversed by the vehicle, and data relating to a multiplicity of objects of various natures localized in said region, these data comprising for each object graphical symbols representative of the nature of the object, a geographical position of the object and a set of detailed information relating to the object, said objects being divided according to the respective natures of said objects into sets of objects respectively associated with distinct means for exploiting the sets of detailed information, said method being performed by said processor and comprising the steps of:

acquiring in real time the geographical position of the vehicle;

determining a projected trajectory to be covered from the present position of the vehicle to a destination position introduced by an operator;

determining periodically a portion of the digitized image representing a geographical zone including the present position of the vehicle and a greatest possible portion of the trajectory to be covered;

transferring from said memories to the display surface the pixel data of the image portion thus determined and displaying graphical symbols representing said portion of trajectory;

displaying in real time superimposed on said image portion displayed on said display surface a graphical symbol representing the vehicle while observing its geographical position with respect to said geographical zone;

selecting objects localized in said geographical zone from amongst at least one set of objects previously selected by the operator;

displaying superimposed on said image portion the graphical symbols representing the objects thus selected while observing their geographical position with respect to said geographical zone; and said method further comprising an exploitation phase of detailed information related to a set of objects selected by the operator from amongst the sets of objects presently displayed on the display surface, said exploitation phase comprising a step of allocating keys of said terminal to activation of programs specific to the exploitation means associated with this selected set of objects, a step of displaying items of detailed information related to an object selected by the operator, according to a presentation mode specific to said associated exploitation means as a function of a program activated by the operator.

2. Method according to claim 1, further comprising:

allocation of a designation device to a set of objects;

designation by the operator with the aid of said designation device of a symbol displayed overprinted on said determined image portion and representing an object of the set to which the designation device is allocated; and exploitation of the set of information associated with the designated object with the aid of the exploitation means associated with the set of objects to which this object belongs.

3. Method according to claim 1, further comprising the steps of:

selecting an object by the operator by designating one of the symbols of objects displayed overprinted on said determined image portion;

displaying by the system detailed information concerning the designated object on the full screen; and displaying by the system detailed information concerning the designated object in a window overprinted on the determined image portion.

4. Method according to claim 3, further comprising the steps of:

activating a designation device associated with the window displayed overprinted on the screen, moving and deleting by the operator said window with the aid of the designation device, storing the detailed information displayed on said window in a storage zone provided to this effect, and displaying the contents of said storage zone overprinted on the determined image portion displayed on the screen.

5. Method according to claim 1, wherein the vehicle is an aircraft, said method further comprising:

calculation at the operator's request of the distance and the course between two geographical points designated by the operator, determination at the operator's request of an optimized route whilst taking account of the weather conditions between the current position of the vehicle and the destination position, and determination at the operator's request of the most suitable airport for the aircraft to be directed to according to restrictions concerning the weather and fuel consumption and the current position of the vehicle.

6. Method accoding to claim 3, wherein the symbols of objects and the displayed detailed information may be of a temporary nature.

7. Method according to claim 1, further comprising displacement by the operator of the image portion displayed on the screen resulting in stopping refreshing of the displayed image portion according to the evolution of the position of the vehicle.

8. Method according to claim 1, further comprising designating by the operator two geographical positions on the map, and displaying by the system overprinted on said determined image portion the distance between said two geographical positions and a course to follow so as to move from the first position to the second position.

9. Method according to claim 8, wherein the designation of a geographical position is carried out by entering its name with the aid of keys of said communication terminal.

10. Method according to claim 1, wherein the digitized map originates from a geopolitical map indicating the zone of high altitudes, water surfaces, major towns, main highways and state frontiers.

11. Method according to claim 1, wherein said vehicle is an aircraft, said method further comprising real-time signalling on the determined image portion summits whose altitude is greater than that of the aircraft.

12. Method according to claim 1, wherein, within the context of air-navigation, said natures of said objects are radionavigation markers, specific zones, air routes, airports, weather information, and the respective positions of other vehicles situated nearby.

13. Method according to claim 1, wherein in the case of air-navigation, the determined image portion is displayed on a scale which may be modified by the operator between a scale of 1 cm for 15 km and a scale of 1 cm for 350 km.

14. Method according to claim 1, further comprising transition from a day mode for displaying maps to a night mode and vice versa, said transition being triggered by a specific key of said terminal and consisting of replacing black points of the portion of the digitized image by white points and white points by black points, remaining colors remain unchanged.

15. A device for assisting navigation on board of a vehicle comprising:

a processor connected to other items of electronic equipment embarked on board the vehicle, at least one man/machine communication terminal connected to the processor and comprising a display screen and control and entry keys for introducing a destination position of the vehicle, and a data base accessible by the processor where are stored a succession of pixel data each representing an image point of a digitized image representing a geopolitical map of the region able to be traversed by the vehicle and data relating to a multiplicity of objects of different natures localized in said region, these data comprising for each object graphical symbols representative of the nature of the object, a geographical position of the object and a set of detailed information relating to the object, these objects being divided according to the respective natures of said objects into sets of objects respectively associated with specific exploitation means for exploiting the sets of detailed information, the processor including:

first means for exploiting data of the data base;

sensors for acquiring in real time a current situation of the vehicle including a current position;

means for determining from said current position and said destination position a trajectory to be traversed by the vehicle;

means to periodically determine a portion of the digitized image representing a geographical zone which includes both the current position of the vehicle and a greatest possible portion of the trajectory to be traversed by the vehicle;

means to display on the displaying surface the determined image portion thus determined and superimposed on said image portion, graphical symbols representing said greatest possible portion of trajectory while observing its geographical position and orientation with respect to said geographical zone;

means to display on the displaying surface, superimposed on said image portion, a graphical symbol representing the vehicle while observing its geographical position with respect to said geographical zone;

means for selecting, among the items of information relating to a set of objects selected by the operator, the information relating to the objects located in said geographical zone;

means to display superimposed on said determined image portion the graphical symbols representative of the objects thus selected while observing their geographical position with respect to said geographical zone; and each of said specific exploitation means defining for the set of objects associated thereto a way items of said information related to said set of objects are chained with one another, a mode for displaying said items of information, active keys of said terminal and functions activated by said active keys.

16. Man/machine communication terminal able to be used in the device according to claim 15, and comprising a displaying screen and keys for entering information and carrying out commands, said keys being divided at the periphery of the screen into four sets of successive keys, a first set allocated to activation of the exploitation means, a second allocated to selection when a menu is displayed on the screen, a third set allocated to control functions of the terminal, and a fourth allocated to displaying and reactivating final selections made by the operator, said keys being reconfigurable according to the page displayed on the screen and each being associated with an adjacent zone of the screen where a label of the function allocated thereto is displayed.

17. Terminal according to claim 16, wherein each of said keys may take up one of three states, namely active, activatable or non activatable which corresponds to the state of the function triggered by the key, each of said keys being associated with signalling means indicating the state of the key.

18. Terminal according to claim 16, wherein said displaying screen includes four edges along which are respectively disposed the four said sets of keys.

19. Man/machine communication terminal able to be used in a device for assisting navigation on board a vehicle and using a documentary management system comprising:

a processor connected to other items of electronic equipment embarked on board the vehicle, a data base accessible by the processor where are stored in particular a digitalized image representing a geopolitical map of the region able to be traversed by the vehicle and data relating to a multiplicity of objects of different natures localized in said region, these data including for each object symbols representative of the nature of the object, a geographical position of the object and a set of detailed information relating to the object, these objects being divided according to the respective natures of said objects into sets of objects respectively associated with distinct means for exploiting the sets of detailed information, each of said exploitation means being accessible through menus which are chained so as to form a tree structure;

the processor comprising:

first means for exploiting the information of the data base;

sensors for acquiring in real time current situation of the vehicle;

means for periodically determining a portion of the digitalized image representing a geographical zone which includes both the current position of the vehicle and a significant portion of the trajectory to be traversed by the vehicle; and specific means for exploiting each set of objects;

said terminal comprising a display screen and control and entry keys for entering information and a destination position of the vehicle, and for carrying out commands, said keys being divided at the periphery of the screen into four sets of successive keys, a first set allocated to activation of the exploitation means, a second set allocated to selection when a menu is displayed on the screen, a third set allocated to control functions of the terminal, and a fourth set allocated to displaying and reactivating final selections of said exploitation means made by the operator, said keys being reconfigurable according to the page displayed on the screen and each being associated with an adjacent zone of the screen where a label of the function allocated thereto is displayed, a key being allocated to displaying successively previously selected menus related to a previously selected exploitation means;

said processor further comprising:

means for displaying on the display screen the portion of said digitized image thus determined and symbols representing said trajectory portion;

means for displaying overprinted on the display screen a symbol representing the vehicle while observing its geographical position with respect to said geographical zone;

means for selecting, among the items of information relating to a set of objects selected by the operator, the information relating to the objects located in said geographical zone;

means for displaying overprinted on said determined image portion the symbols representative of the objects thus selected while observing their geographical position with respect to said geographical zone, wherein the keys allocated to displaying and reactivating the final selections of exploitation means are respectively associated with a zone of the screen where respective labels of these final selections appear, the key associated with the last final selection being non activatable and the keys associated with the other final selections being able to be activatable and allowing for display of a last page displayed concerning the associated selection.

20. Terminal according to claim 16, further comprising keys for enlarging the scale of the determined image portion displayed on the screen.

21. Terminal according to claim 16, further comprising a first key allocated to displaying and activating a cursor, a second key for moving the cursor as far as a determined position of the determined image portion displayed and a third key for validating said determined position of the cursor.

22. Terminal according to claim 16, further comprising a fourth key allocated to reactivation of the periodic determination and displaying of a portion of said digitized image including the position of the vehicle and its trajectory.

23. Method for assisting navigation on board a vehicle using a documentary management system based on processors comprising at least one communication terminal including a display surface and memories storing in particular a digitized image representing a geopolitical map of the region likely to be traversed by the vehicle, and data relating to a multiplicity of objects of various natures localized in said region, these data comprising for each object symbols representative of the nature of the object, a geographical position and a set of detailed information relating to the object, said objects being divided according to the respective natures of said objects into sets of objects respectively associated with distinct means for exploiting the sets of detailed information, said method comprising the steps of:

acquiring in real time the geographical position of the vehicle;

introducing the trajectory to be covered from a departure position of the vehicle to a destination position;

determining periodically a portion of the digitized image representing a geographical zone including the present position of the vehicle and a significant portion of the trajectory to be covered by the vehicle;

displaying on the display surface said portion of the digitized image thus determined and said significant portion of said trajectory which is indicated by a set of straight parallel segments crossing perpendicularly at their respective middles an axis joining the departure aid destination positions, said segments being spaced by a distance corresponding to the distance covered by the vehicle during a constant period at an average speed;

displaying overprinted in real time on said display surface a symbol representing the vehicle while observing its geographical position with respect to said geographical zone;

selecting by the operator at least one set of objects;

selecting by the system from amongst the sets of detailed information relating to the set of selected objects, detailed information relating to the objects localized in said geographical zone;

displaying by overprinting on said determined image portion the symbols representing the objects thus selected while observing their geographical position with respect to said geographical zone; and selecting by the operator a set of objects presently displayed on the display surface, and activating the exploitation means associated with this set of objects.

24. Man/machine communication terminal able to be used in a device for assisting navigation on board a vehicle and using a documentary management system comprising:

a processor connected to other items of electronic equipment embarked on board the vehicle, a data base accessible by the processor where are stored a succession of pixel data each representing an image point of a digitalized image representing a geopolitical map of the region able to be traversed by the vehicle and data relating to a multiplicity of objects of different natures localized in said region, these data including for each object symbols representative of the nature of the object, a geographical position of the object and a set of detailed information relating to the object, these objects being divided according to the respective natures of said objects into sets of objects respectively associated with distinct means for exploiting the sets of detailed information, each of said exploitation means being accessible through menus which are chained so as to form a tree structure;

the processor comprising:

first means for exploiting the information of the data base;

sensors for acquiring in real time current situation of the vehicle;

means for periodically determining a portion of the digitalized image representing a geographical zone which includes both the current position of the vehicle and a significant portion of the trajectory to be traversed by the vehicle; and specific means for exploiting each set of objects;

said terminal comprising a display screen and control and entry keys for entering information and a destination position of the vehicle, and for carrying out commands, said keys being divided at the periphery of the screen into four sets of successive keys, a first set allocated to activation of the exploitation means, a second set allocated to selection when a menu is displayed on the screen, a third set allocated to control functions of the terminal, and a fourth set allocated to displaying and reactivating final selections of said exploitation means made by the operator, said keys being reconfigurable according to the page displayed on the screen and each being associated with an adjacent zone of the screen where a label of the function allocated thereto is displayed, a key being allocated to displaying successively previously selected menus related to a previously selected exploitation means;

said processor further comprising:

means for displaying on the display screen the portion of said digitized image thus determined and symbols representing said trajectory portion;

means for displaying overprinted on the display screen a symbol representing the vehicle while observing its geographical position with respect to said geographical zone;

means for selecting, among the items of information relating to a set of objects selected by the operator, the information relating to the objects located in said geographical zone;

means for displaying overprinted on said determined image portion the symbols representative of the objects thus selected while observing their geographical position with respect to said geographical zone.

25. Method according to claim 8, wherein the designation of a geographical position is carried out by entering its geographical coordinates with the aid of keys of said communication terminal.

26. Method according to claim 23, further comprising:

allocation of a designation device to a set of objects;

designation by the operator with the aid of said designation device of a symbol displayed overprinted on said determined image portion and representing an object of the set to which the designation device is allocated; and exploitation of the set of information associated with the designated object with the aid of the exploitation means associated with the set of objects to which this object belongs.

27. Method according to claim 23, further comprising the steps of:

selecting an object by the operator by designating one of the symbols of objects displayed overprinted on said determined image portion;

displaying by the system detailed information concerning the designated object on the full screen; and displaying by the system detailed information concerning the designated object in a window overprinted on the determined image portion.

28. Method according to claim 27, further comprising the steps of:

activating a designation device associated with the window displayed overprinted on the screen, moving and deleting by the operator said window with the aid of the designation device, storing the detailed information displayed on said window in a storage zone provided to this effect, and displaying the contents of said storage zone overprinted on the determined image portion displayed on the screen.

29. Method according to claim 23, wherein the vehicle is an aircraft, said method further comprising:

calculation at the operator's request of the distance and the course between two geographical points designated by the operator, determination at the operator's request of an optimized route whilst taking account of the weather conditions between the current position of the vehicle and the destination position, and determination at the operator's request of the most suitable airport for the aircraft to be directed to according to restrictions concerning the weather and fuel consumption and the current position of the vehicle.

30. Method according to claim 27, wherein the symbols of objects and the displayed detailed information may be of a temporary nature.

31. Method according to claim 23, further comprising displacement by the operator of the image portion displayed on the screen resulting in stopping refreshing of the displayed image portion according to the evolution of the position of the vehicle.

32. Method according to claim 23, further comprising designating by the operator two geographical positions on the map, and displaying by the system overprinted on said determined image portion the distance between said two geographical positions and a course to follow so as to move from the first position to the second position.

33. Method according to claim 32, wherein the designation of a geographical position is carried out by entering its name with the aid of keys of said communication terminal.

34. Method according to claim 23, wherein the digitized map originates from a geopolitical map indicating the zone of high altitudes, water surfaces, major towns, main highways and state frontiers.

35. Method according to claim 23, wherein said vehicle is an aircraft, said method further comprising real-time signalling on the determined image portion summits whose altitude is greater than that of the aircraft.

36. Method according to claim 23, wherein, within the context of air-navigation, said natures of said objects are radionavigation markers, specific zones, air routes, airports, weather information, and the respective positions of other vehicles situated nearby.

37. Method according to claim 23, wherein in the case of air-navigation, the determined image portion is displayed on a scale which may be modified by the operator between a scale of 1 cm for 15 km and a scale of 1 cm for 350 km.

38. Method according to claim 23, further comprising transition from a day mode for displaying maps to a night mode and vice versa, said transition being triggered by a specific key of said terminal and consisting of replacing black points of the portion of the digitized image by white points and white points by black points, remaining colors remain unchanged.

39. Method according to claim 32, wherein the designation of a geographical position is carried out by entering its geographical coordinates with the aid of keys of said communication terminal.

* * * * *